(12) United States Patent
Chaudhry

(10) Patent No.: US 8,813,687 B2
(45) Date of Patent: Aug. 26, 2014

(54) CONTROL ALGORITHM FOR WATER HEATER

(75) Inventor: Raheel A. Chaudhry, Montgomery, AL (US)

(73) Assignee: Rheem Manufacturing Company, Atlanta, GA (US)

(*) Notice: Subject to any disclaimer, the term of this patent is extended or adjusted under 35 U.S.C. 154(b) by 398 days.

(21) Appl. No.: 13/272,430

(22) Filed: Oct. 13, 2011

(65) Prior Publication Data

US 2013/0092102 A1   Apr. 18, 2013

(51) Int. Cl.
F24H 9/20 (2006.01)
F24H 1/20 (2006.01)
F24H 1/18 (2006.01)

(52) U.S. Cl.
CPC ............ *F24H 9/2021* (2013.01); *F24H 1/185* (2013.01); *F24H 9/2035* (2013.01); *F24H 1/207* (2013.01)
USPC ........................................ 122/14.1; 392/463

(58) Field of Classification Search
USPC .............. 122/14.1, 14.22; 392/449, 498, 463, 392/464; 219/483, 485, 486, 497
See application file for complete search history.

(56) References Cited

U.S. PATENT DOCUMENTS

| | | | |
|---|---|---|---|
| 5,660,328 A * | 8/1997 | Momber | 236/20 R |
| RE37,745 E | 6/2002 | Brandt et al. | |
| 6,560,409 B2 * | 5/2003 | Troost, IV | 392/498 |
| 6,880,493 B2 * | 4/2005 | Clifford | 122/14.22 |
| 6,955,301 B2 * | 10/2005 | Munsterhuis et al. | 236/20 R |
| 7,380,522 B2 | 6/2008 | Krell et al. | |
| 7,712,677 B1 | 5/2010 | Munsterhuis et al. | |
| 2007/0034169 A1 | 2/2007 | Phillips | |
| 2007/0175883 A1 * | 8/2007 | Miu et al. | 219/400 |
| 2008/0314999 A1 | 12/2008 | Strand | |

* cited by examiner

*Primary Examiner* — Gregory A Wilson
(74) *Attorney, Agent, or Firm* — Haynes and Boone, LLP

(57) ABSTRACT

A storage type water heater, which may have either fuel or electric-based heating apparatus, is provided with a control system incorporating a control algorithm that monitors the time between heat demands and then sets the tank water setpoint temperature accordingly to lower the effects of water stratification due to periodic heat demands, and also save energy. When the time between consecutive heat demands is less than a predetermined setback time, for a number of heat demands equal to a predetermined setback limit, a setback mode is activated and responsively operates to reduce the setpoint temperature by a predetermined setback offset at the next cycle. The original control setpoint temperature is restored once the time between two successive heat demands is more than the setback time.

18 Claims, 2 Drawing Sheets

CONTROL ALGORITHM FOR WATER HEATER

BACKGROUND OF THE INVENTION

The present invention generally relates to liquid heating apparatus and, in a representatively illustrated embodiment thereof, more particularly relates to a storage type water heater having incorporated therein a specially designed control algorithm that reduces undesirable temperature stratification in the water heater and improves its energy factor.

As conventionally manufactured, a storage type water heater, whether of a fuel-fired or electric heating apparatus type, has an insulated tank for storing heated water for on-demand delivery to various plumbing fixtures such as sinks, bath tube, showers, dishwashers and the like. The water stored in the tank is heated by heating apparatus in the form of a fuel burner or one or more electrical resistance type heating elements operated by a thermostatic control system in response to a sensed temperature of the tank water falling below a predetermined setpoint temperature.

A problem commonly associated with such fuel-fired or electrically heated storage type water heaters is that of thermal stratification or "stacking" in which stored water in an upper end portion of the tank reaches significantly higher temperatures than the setpoint temperature. Since supply water from the tank is typically drawn from the upper end of the tank, a stacking condition in the tank can lead to hot water delivered to a user from the tank being at a substantially higher temperature than anticipated Additionally, this stacking effect may undesirably increase stand-by losses associated with the water heater.

It can therefore be seen that it would be desirable to provide a fuel-fired or electrically heated storage type water heater in which both stacking and related reduction in the water heater energy factor are diminished. It is to this goal that the present invention is primarily directed.

DETAILED DESCRIPTION

Figure 1:
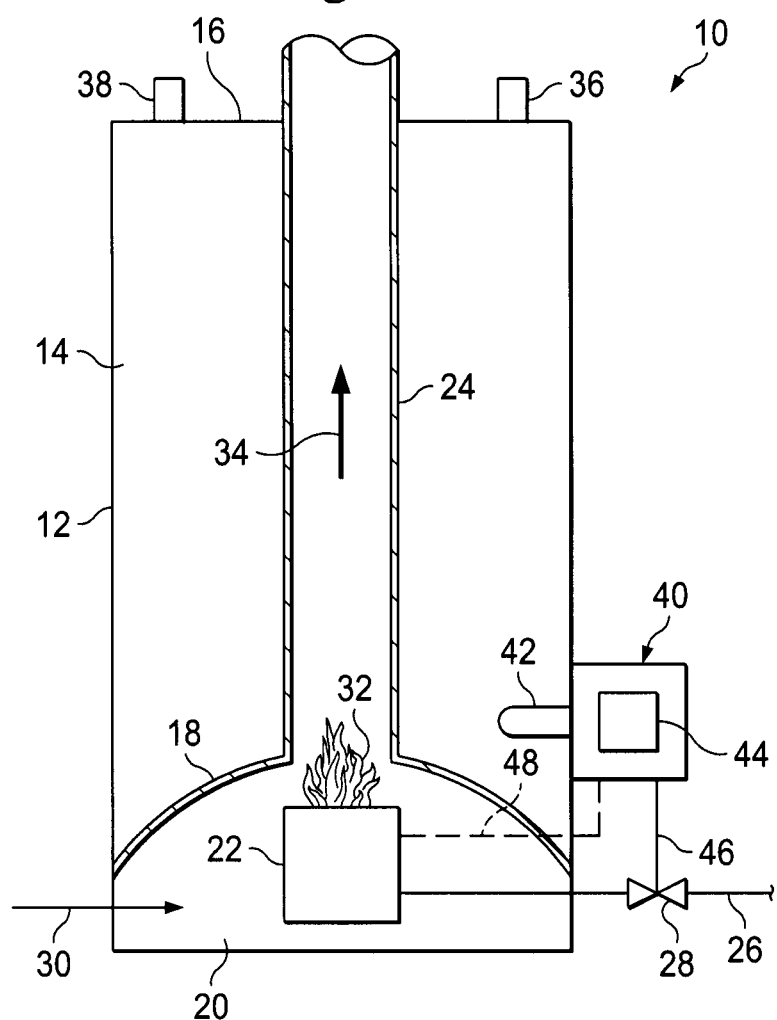
FIG. 1 schematically depicts a representative storage type water heater incorporating therein a specially designed heating apparatus control algorithm embodying principles of the present invention.

Schematically depicted in FIG. 1 is a representative storage type water heater 10 that embodies principles of the present invention. Representatively, but not by way of limitation, water heater 10 is a 30 gallon high input residential gas-fired atmospheric water heater. Alternatively, the water heater 10 could be an electric storage type water heater without departing from principles of the present invention.

Water heater 10 has an insulated tank 12 in which pressurized water 14 is stored for on-demand delivery from the tank 12 to various hot water-utilizing plumbing fixtures such as sinks, dishwashers, bathtubs, showers and the like. The tank 12 has an upper end 16, and a lower end 18 that overlies a combustion chamber 20 in which a gas burner 22 is operatively disposed. Burner 22 is disposed beneath the open lower end of a flue 24 that communicates with the interior of the combustion chamber 20 and centrally extends upwardly through the tank 12 and outwardly through its upper end 16. An electric version of the water heater would illustratively have, as a heating apparatus counterpart to the fuel burner 22, one or more submersible resistance type electric heating elements extending into the tank 12.

Fuel gas is supplied to the burner via a gas supply line 26 in which a control valve 28 is operatively disposed. During firing of the burner 22, gas delivered to the burner 22 via the supply line 26 is mixed with combustion air 30 and combusted. The resulting burner flame 32 creates hot combustion gases 34 that flow upwardly through the flue 24 and conductively flow combustion heat therethrough to the tank water 14. The opening of a plumbing fixture operatively connected to the water heater 10 causes pressurized heated water 14 to flow outwardly from the tank 14 to the opened fixture, via a hot water outlet fitting 36 disposed on the upper end 16 of the tank 12, until the fixture is closed. Heated water 14 exiting the tank in this manner is automatically replaced with cold water, from a suitable pressurized source thereof, via a cold water inlet fitting 38 on the top end 16 of the tank 12.

The temperature of the tank water 14 is automatically regulated by means of schematically depicted control apparatus 40 which is illustratively mounted on a lower outer side portion of the tank 12. In a generally conventional manner, the control apparatus 40 is provided with a temperature sensing element 42 that projects into the tank water 14. Using a preprogrammed microprocessor chip 44, the control apparatus 40 compares the sensed water temperature to a selectively variable, typically user-chosen setpoint temperature, and periodically energizes the burner 22 as necessary, operating the fuel valve 28 via the schematically depicted valve control line 46, to maintain the desired tank water temperature.

According to a key aspect of the present invention, in a manner which will now be described the control apparatus 40 also uniquely functions, illustratively via a specially designed algorithm programmed into the microprocessor chip 44, to monitor (via the schematically depicted dashed control line 48) operational characteristics of the burner 22 (or electric heating element(s) as the case may be) and automatically utilize such monitored characteristics to substantially reduce undesirable water temperature stratification or "stacking" within the tank 12 and thereby increase the energy factor of the water heater 10. Specifically, as will now be described, the control apparatus 40 monitors the time between successive burner energizations indicative of successive calls for heat and utilizes this information in a predetermined manner to automatically lower the water temperature control setpoint temporarily as necessary to reduce undesirable water temperature stacking within the tank 12.

Figure 2:
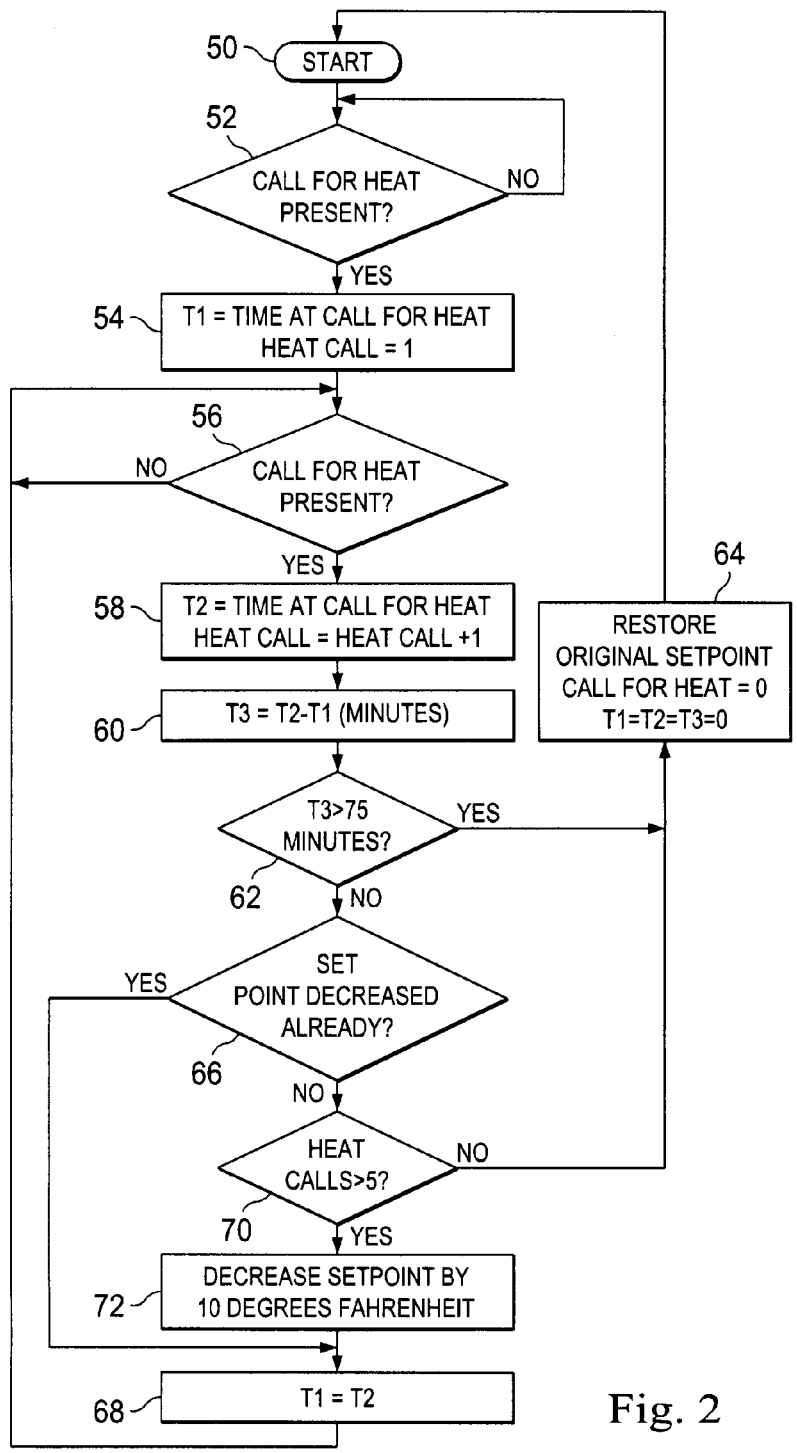
FIG. 2 is a logic flow chart illustrating the operation of the heating apparatus control algorithm.

As used herein, a "heat demand cycle" begins when the burner 22 (or alternatively heating apparatus in the form of at least one electric heating element) comes on in response to the sensed water temperature-based initiation of a heat call (or "heat demand") by the control apparatus 40, and ends when the heat demand is satisfied and the burner 22 shuts off. The time between any two successive heat demand cycles is the time between the burner firing initiation (or electric heating element energization) of the first heat demand cycle and the burner firing initiation (or electric heating element energization) of the second heat demand cycle Shown in FIG. 2 is a schematic logic flow diagram of the previously mentioned specially designed anti-stacking algorithm programmed into the microprocessor chip 44. The algorithm will be described in conjunction with the fuel-fired water heater embodiment 10. However, it is also utilizable to advantage in a water heater in which the heating apparatus comprises one or more electric heating elements.

At the algorithm starting point 50 the setpoint temperature of the control apparatus 40 is at an original value, the starting number of heat calls made by the water heater 10 is set to zero, and the initial time value is set to zero. At the first step 52 after the start 50 a query is made as to whether a first call for heat is present in the water heater 10. If no call for heat is currently present, the algorithm simply loops as indicated at step 52. If a call for heat is present, at step 54 the time at this first heat call (at which time the burner 22 is turned on) is set at "T1", and the total number of heat calls detected at that time ("Heat Call") is set to 1. A transfer is then made to step 56 at which a query is made as to whether there is another call for heat. If there is not, the algorithm loops as indicated at step 56. If there is, at step 58 the time at this second heat call is set at "T2", and the total number of heat calls at time T2 ("Heat Call") is increased by 1. At step 60 the time period T3 between the previous two heat call times T2 and T1 is computed.

Next, at step 62 a query is made as to whether the time period T3 is greater than a predetermined heat call time interval period, representatively 75 minutes. If T3 is greater than 75 minutes, a transfer is made to step 64 at which the water temperature control setpoint is set at its original user-determined value (if the setpoint temperature has been lowered as subsequently described), and the values of "heat call", T1, T2 and T3 are reset to zero.

If at step 62 T3 is not greater than 75 minutes a transfer is made to step 66 at which a query is made as to whether the setpoint has already been decreased (by the control system). If it has, a transfer is made to step 68 at which the time value T1 is set to the time value T2 and a return is made to step 56 to await the next heat call.

If at step 66 the setpoint temperature has not decreased already, a transfer is made to step 70 at which a query is made as to whether the total number of heat calls (i.e., the value of "Heat Call") is greater than 5. If it is not, a transfer is made to step 64. If it is, a transfer is made to step 72 at which the setpoint is decreased by ten degrees Fahrenheit, the value of T1 is set to T2, and a transfer is made back to step 56 to await the next heat call.

The representative control algorithm just described incorporating principles of the present invention may be summarized as follows. In this algorithm, the control apparatus 40 monitors the time between the heat demands (i.e., the time between burner firings) and then sets the setpoint temperature accordingly. This mode (i.e., with the lowered setpoint temperature) is activated to lower the effects of water stratification due to periodic demands (such as machine draws) and also save energy associated with stand-by heat losses as well as any other components that consume energy with burner cycles (such as flue dampers). When the time between consecutive heat demands in less than a "setback time", for a number of heat demands equal to a "setback limit", the setback mode is activated. During the setback mode the user-selected tank water temperature setpoint is reduced by a predetermined magnitude called the "setback offset" at the next cycle. This mode has no effect on the differential. The original setpoint temperature is restored once the time between the heat demands is more than the "setback time".

As will be readily appreciated by those of skill in this particular art, various modifications could be made to the control algorithm schematically depicted in FIG. 2 without departing from principles of the present invention. For example, one or more of the representative 75 minute setback time, the representative setback limit of 6 heat demands, and the representative 10 degree Fahrenheit setback offset magnitude could be increased or decreased if desired. Additionally, as representatively illustrated in FIG. 2, the setpoint setback de-activation results in returning to the original user-determined set point at once, but could occur in stages if desired. Moreover, the described algorithm of the present invention could be utilized in conjunction with a conventional anti-stacking algorithm in the water heater 10, with the conventional anti-stacking algorithm being disabled for tank water temperatures below a predetermined magnitude (for example, 140 degrees Fahrenheit), and the algorithm of the present invention being enabled for tank water temperatures less than or equal to 140 degrees Fahrenheit.

The foregoing detailed description is to be clearly understood as being given by way of illustration and example only, the spirit and scope of the present invention being limited solely by the appended claims.

What is claimed is:

1. A fuel-fired water heater comprising:
   a tank in which water may be stored;
   heating apparatus operative to heat the stored water to and maintain the heated water at a predetermined original setpoint temperature; and
   control apparatus for sensing the tank water temperature and responsively controlling said heating apparatus, said control apparatus incorporating therein a control algorithm operative to:
      monitor the time between heating apparatus energizations in each successive pair of heat demands,
      activate a setback mode in which said predetermined original setpoint temperature is reduced by a predetermined setback limit magnitude, when the times between heating apparatus energizations in consecutive heat demands are each less than or equal to a predetermined setback time for a predetermined setback limit number of heat demands, and then
      return the reduced setpoint temperature to the original setpoint temperature in response to the time between heating apparatus energizations in two successive heat demands subsequent to the setpoint temperature reduction being greater than said predetermined setback time.

2. The fuel-fired water heater of claim 1 wherein said heating apparatus comprises a fuel burner.

3. The fuel-fired water heater of claim 1 wherein said tank has a capacity of approximately thirty gallons.

4. The fuel-fired water heater of claim 1 wherein said water heater is a residential water heater.

5. The fuel-fired water heater of claim 1 wherein said heating apparatus comprises a gas burner.

6. The fuel-fired water heater of claim 1 wherein:
   said water heater is a thirty gallon high input residential gas-fired atmospheric water heater.

7. The fuel-fired water heater of claim 1 wherein:
   said predetermined setback limit magnitude is approximately ten degrees Fahrenheit.

8. The fuel-fired water heater of claim 1 wherein:
   said predetermined setback time is approximately 75 minutes.

9. The fuel-fired water heater of claim 1 wherein:
   said predetermined set back limit number of heat demands is six.

10. The fuel-fired water heater of claim 1 wherein:
    said reduced setpoint temperature is non-incrementally returned to said original setpoint temperature.

11. The fuel-fired water of claim 1 wherein said control apparatus is operative to:
    reduce said predetermined original setpoint temperature by said predetermined setback limit magnitude to a constant reduced setpoint temperature, and to
    return said constant reduced setpoint temperature to said original setpoint temperature in response to the time between heating apparatus energizations in two successive heat demands subsequent to the setpoint reduction being greater than said predetermined setback time.

12. Control apparatus for controlling a water heater having a tank for storing water, and heating apparatus operative to heat the stored water to and maintain the heated water at a setpoint temperature, said control apparatus being operative to:

sense the tank water temperature and initiate a heat demand, which energizes said heating apparatus, in response to detecting a tank water temperature below said setpoint temperature;

monitor the time between each successive pair of heat demands;

reduce the setpoint temperature by a predetermined magnitude when the times between consecutive heat demands are each less than or equal to a predetermined setback time for a predetermined setback limit number of heat demands, and then return the reduced setpoint temperature to the original setpoint temperature in response to the time between two successive heat demands subsequent to the setpoint temperature reduction is greater than said predetermined setback time.

13. A water heater incorporating the control apparatus of claim 12.

14. The control apparatus of claim 12 wherein said control apparatus is operative to:

reduce the setpoint temperature by a predetermined magnitude to a constant reduced setpoint temperature when the times between consecutive heat demands are each less than or equal to said predetermined setback time for said predetermined setback limit number of heat demands, and then return the constant reduced setpoint temperature to the original setpoint temperature in response to the time between two successive heat demands subsequent to the setpoint temperature reduction is greater than said predetermined setback time.

15. A method of controlling a water heater having a tank for storing water, and heating apparatus operative to heat the stored water to and maintain the heated water at a predetermined original setpoint temperature, said method comprising the steps of:

sensing the tank water temperature and initiating a heat demand, which energizes said heating apparatus, in response to detecting a tank water temperature below said original setpoint temperature;

monitoring the time between each successive pair of heat demands;

reducing said original setpoint temperature by a predetermined magnitude when the times between consecutive heat demands are each less than or equal to a predetermined setback time for a predetermined setback limit number of heat demands, and then returning the reduced setpoint temperature to said original setpoint temperature in response to the time between two successive heat demands subsequent to the setpoint temperature reduction being greater than said predetermined setback time.

16. The method of claim 15 wherein:

said returning step is performed by non-incrementally returning the reduced setpoint temperature to said original setpoint temperature.

17. The method of claim 15 wherein:

said monitoring step is performed by monitoring the times between successive pairs of heating apparatus energizations.

18. The method of claim 15 wherein:

said reducing step is performed by reducing said original setpoint temperature by a predetermined magnitude to a constant reduced setpoint temperature when the times between consecutive heat demands are each less than or equal to said predetermined setback time for a predetermined setback limit number of heat demands, and said returning step is performed by returning said constant reduced setpoint temperature to said original setpoint temperature in response to the time between two successive heat demands subsequent to the setpoint temperature reduction being greater than said predetermined setback time.

* * * * *